United States Patent Office 3,517,430
Patented June 30, 1970

3,517,430
WORK-SETTING STATIONS
David Theodore Nelson Williamson, Richard Graham Crosland, and Philip Richard Christal, Deptford, London, England, assignors to Molins Machine Company Limited, Deptford, London, England, a corporation of Great Britain
Filed May 1, 1968, Ser. No. 725,847
Claims priority, application Great Britain, May 5, 1967, 21,108/67
Int. Cl. B23p 19/04
U.S. Cl. 29—208                    24 Claims

ABSTRACT OF THE DISCLOSURE

A work-setting station has driven chain conveyors to feed pallets in linked pairs over a support table from a receiving position, to which a transporter delivers pallets, towards a work-setting position and therefrom to a collection position from which the transporter collects pallets. Upper and lower conveyors feed bins respectively to and from the station which has inclined bin ramps from the upper conveyor to a bin compartment and therefrom to the lower conveyor. Switches and read-heads indicate to a controlling computer the positions and identifying binary numbers of pallets and bins at the station.

---

This invention concerns improvements in or relating to work-setting stations, i.e. stations at which work-setting operations are performed.

A work-setting operation is an operation involving a workpiece and a workpiece holder which is to be performed in connection with, e.g. in preparation for, a machining operation to which the workpiece is subjected. The fixing of workpieces to workpiece holders, such as pallets, for machining, and the unloading of workpieces from workpiece holders after machining, and the re-fixing of workpieces to holders after initial machining and for further machining are examples of work-setting operations. Such operations are, for example, performed in a production system as described in U.S. application Ser. No. 695,817.

According to the present invention there is provided a work-setting station comprising support means adapted to support a plurality of workpiece holders and having a receiving position, at which a workpiece holder can be received on the support means, a collection position, from which a workpiece holder can be collected from the support means, and a work-setting position, at which a work-setting operation can be performed on a workpiece holder, and guide means to guide a workpiece holder from said receiving position to said work-setting position and from said work-setting position to said collection position.

Preferably there are provided feed means, such as driven chains, operable to feed a workpiece from said receiving position to said work-setting position, and from said work-setting position to said collection position.

The station may comprise container support means defining a compartment for a container containing material to be used in a work-setting operation, and there may be a container receiving position and a container delivery position and guide means to guide a container from the receiving position to said compartment and from said compartment to the delivery position. Sensing means may be provided to sense the presence of a container in said compartment and the sensing means may be capable of reading an identification on a container in said compartment.

The station may comprise one or more turntables operable to change the orientation of a workpiece holder during its passage through the station, and said work-setting position may be provided with devices operable automatically to locate a workpiece holder accurately for a work-setting operation.

There may be provided sensing means to sense the presence of, and preferably capable of reading an identification on, a workpiece holder at a predetermined position, for example said collection position, in the station, and operation of said feed means may be by control means responsive to such sensing.

Apparatus in accordance with the invention will now be described, by way of example, with reference to the accompanying drawings, in which:

FIG. 5 is a perspective view of a bin, FIG. 6A and B together show a side elevation of a work-setting station, partly in section.

The mechanism and devices described herein are also described in use in a machine tool installation in the forementioned application and in the following description the mechanism and devices as used in such an installation.

Figure 1:
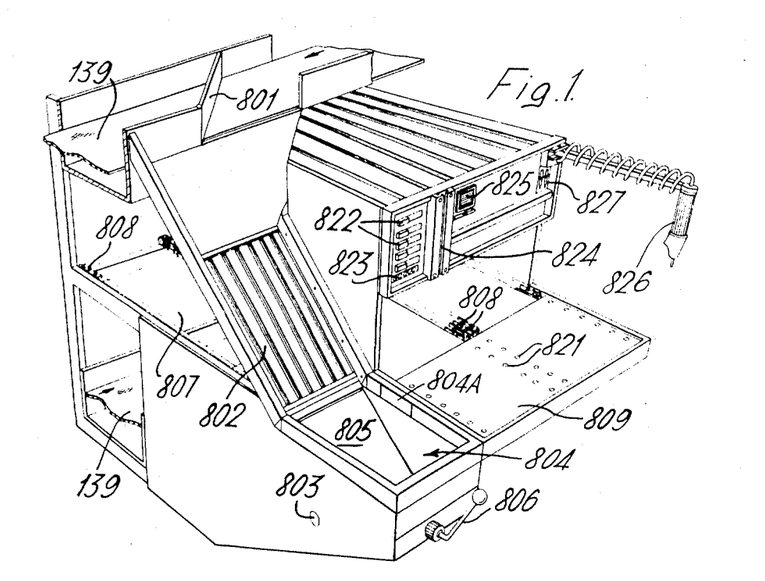
FIG. 1 is a perspective view of a work-setting station or table.
Figure 5:
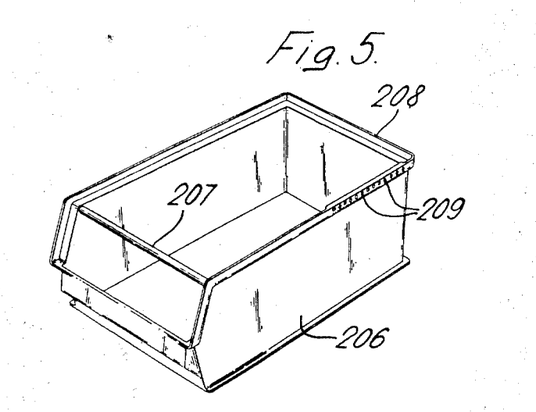

A work-setting or work-fixing table or station and its relationship to a conveyor 139, is shown in FIG. 1. The conveyor 139 is an endless moving belt whose upper horizontal run conveys material, including workpieces and tooling, in bins to the work-setting station and whose lower horizontal run conveys bins away from the work-setting station. One such bin is shown in FIG. 5. It comprises a box-like member 206 with an open top and a partly open inclined front face above which is a cross bar 207. An identifying number is located on one outer side of a rim 208, and is in the form of magnetic and non-magnetic plugs in holes 209 which provide a number based on the binary system as more fully described in the above mentioned application. The table has a movable gate member 801 which is automatically opened by an on-line computer to extend across the upper run of the conveyor 139 when a bin destined for the table is being carried on the conveyor. The gate member 801 deflects the bin from the conveyor 139 to the work-setting table and the gate then automatically closes. The bin slides down an inclined ramp 802 at the lower end of which is a compartment 804 in which a bin rests while a human work-setter is working from it. The compartment 804 has a base 805 movable about a pivot 803 which the work-setter can open, by means of a handle 806, to release a bin on which he (or she) has finished working for travel down a further inclined ramp (not visible in FIG. 1) on to the lower run of the conveyor 139, which returns the bin to a bin preparation area. A read head 804A is provided to read the identifying number of a bin in the compartment 804.

The work-setting table or station receives pallets from a transporter 138 (described in the application mentioned above) at a receiving position 807 and has devices, including driven chains 808, to move the pallets in a horizontal path through the work-setting table over a plate 809, at which the actual work-setting is carried out, and to a collection position (not visible in FIG. 1) at which the transporter 138 can collect the pallets.

Figure 4:
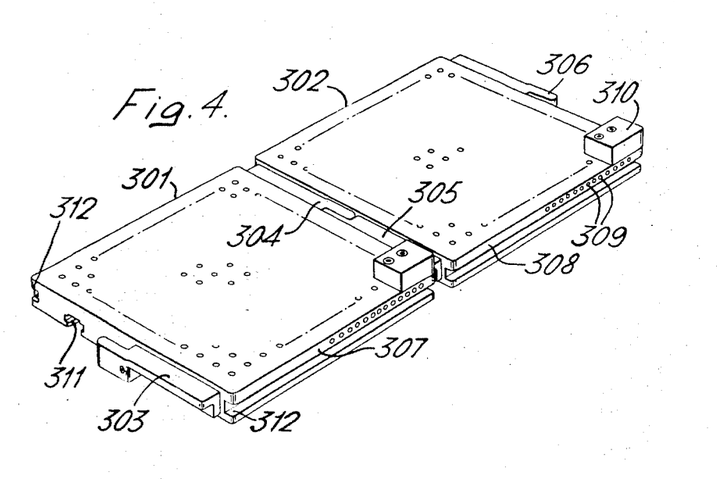
FIG. 4 is a perspective view of a pair of pallets.

The pallets are transported in linked pairs, one such linked pair of pallets 301 and 302 being shown in FIG. 4. The pallet 301 is provided with side lugs 303 and 304, and the pallet 302 has similar side lugs 305 and 306, the pallets being linked by engagement of the lugs 304 and 305. A similar linking can, if desired, be effected by engagement of the lugs 303 and 306. Each pallet has an identifying number (the numbers of the two pallets of a pair being the same) on one side, i.e. the sides 307 and 308 respectively, in the form of thirteen holes 309 each containing either a magnetic or a non-magnetic plug and thereby providing a binary member as more fully described in the above mentioned application. Each pallet further has a datum pad 310 on its upper surface, T slots 311 in its base, and side grooves 312 for purposes described in the above mentioned application.

Figure 2:
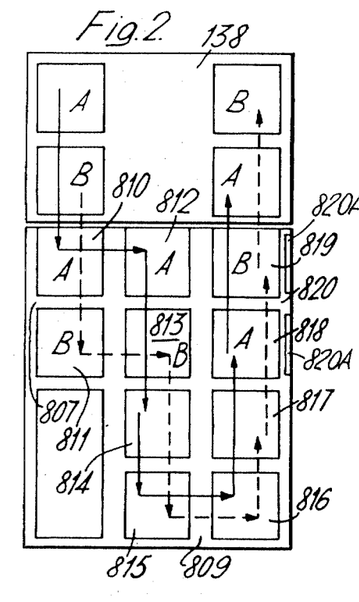
FIG. 2 is a diagrammatic representation of the movement of pallets through the work-setting station or table shown in FIG. 1.

The passage of a pair of linked pallets A and B from the transporter 138 through the work-setting table and back to the transport 138 is illustrated diagrammatically in FIG. 2, in which full line arrows indicate movement of pallet A and broken line arrows movement of pallet B.

The pair of pallets A and B, which are linked as described above, is delivered from one platform (the left hand one as viewed in FIG. 2) of the transporter to the receiving position 807 of the work-setting table, at which the pallets A and B respectively occupy the positions indicated as 810 and 811. The pallets A and B are then moved, as a linked pair, to the right as viewed in FIG. 2, to occupy respectively the positions 812 and 813, and then forwardly (still as a linked pair) to occupy respectively the positions 814 and 815. This latter position 815 occupied at this time by the pallet B is on the plate 809 and the work-setter can then perform the required work-setting operation on that pallet. After the operation, pallet B is moved to the right (thereby unlinking the pallets) to occupy position 816 and pallet A is moved forward to position 815 at which the work-setter performs the appropriate work-setting operation on pallet A. Pallet B is then moved rearwardly to position 817 and pallet A is moved across to position 816 (pallet A being lifted slightly as it is so moved, to permit its lug to pass over the lug of pallet B, and is then lowered to relink the pallets). Pallets A and B are then moved rearwardly as a linked pair, to occupy respectively the positions 818 and 819, at the collection position 820, from which the linked pair of pallets can be received on the right hand platform (as viewed in FIG. 2) of the transporter 138. The two platforms of the transporter 138 are so spaced that one pair of pallets can be delivered to the receiving position of 807 of the work-setting table while another pair of pallets is simultaneously collected from the collection position 820.

It will be seen that by this arrangement of the work-setting table there can be provided a buffer store of two pairs of incoming pallets (at positions 810, 811 and 812, 813) and one pair of outgoing pallets (at positions 818 and 819) between the transporter 138 and the positions (814, 815, 816 and 817) actually used by the work-setter when moving the pallets of a pair through a work-setting operation. The plate 809 is provided with bearings, and preferably air-bearings 821 (see FIG. 1) to assist the operator's movement of pallets across the plate.

Read-heads 820A are provided to read the identifying numbers (provided as described above) of the pallets of a pair at the delivery position 820.

In front of the operator, i.e. above and slightly to the rear of the plate 809, is a panel containing indicators 822 which can, under control of the on-line computer, light up to inform the operator of the type of work-setting operation to be performed. Thus an indicator, when lit, displays a legend such as "Set," "Re-Set" or "Unload." Below the indicators is a digital clock 823 (also operated by the computer), having plus and minus signs, which displays to the operator the time remaining for completion of a job by giving a count-down from its commencement, and further displays between jobs the cumulative difference between the time norm and the actual time taken for work-setting operations performed through the day.

Next to the indicator and clock panel is a support guide 824 for a work-setting template, and next to that is an intercommunication loudspeaker/microphone 825 connecting with a human controller (and which may also be used to relay music during working hours). A torque-limiting pneumatic screwdriver 826 is provided for use in fixing tooling to pallets and workpieces to tooling, together with a holder 827 for change tools for use in the screw-driver. The operations performed at and by the work-setting table are as follows.

When work-setting operations on a job are to be performed, the bin containing the workpieces, tooling, a work-setting template etc. of that job is (under control of the on-line computer) placed on the upper run of the conveyor 139 and the gate 801 of the work-setting table designated by the computer (there being a number of such tables along the conveyor) is opened to deflect the bin from the conveyor to that table. On arrival of the bin in the compartment 804 its number is read and is signalled back to the computer. The computer has (as described in the above mentioned application) allocated a group of pallets to that job, and instructs the transporter 138 to collect the first pair of pallets of that group from a pallet rack and deliver them to the receiving position 807 of the work-setting table. The computer, responsively to the reading of the bin number, also lights up the "Set" indicator on the display panel. The operator can then study work-setting instructions in the bin, and mount the work-setting template in the guide 824, while delivery of the pallets is awaited.

On arrival of the first pair of pallets at the receiving position 807 (when the transporter 138 is simultaneously withdrawing the last pair of pallets of the preceding job, if any, from the collection position 820) the computer starts the count-down on the clock 823, and operates the devices (including the chains 808) to move the pair of pallets until they reach the positions 814 and 815. Whilst a pair of pallets is on the transporter 138 their presence is continually being signalled back to the computer due to the presence of their identifying numbers in front of a read head on the transporter. The computer is thus aware of the pallets leaving the transporter when such signals cease to be received from the read head thereon.

The operator then carries out the necessary work-setting operations on the leading pallet and then on the second pallet of the pair using the screw driver 826 (the actual operations being carried out in a manner as described in British patent application No. 17,248/67. While the operator is performing these operations on the first pair of pallets the transporter 138 can deliver two further pairs of pallets, the first further pair being automatically moved on arrival at the receiving position 807 to the positions 812 and 813.

When the operator has completed operations on and has relinked the two pallets of the first pair they are moved forward to the collection position 820, where their number is read by the read head 820A which transmit a signal inricative of the number to the computer. The computer responsively causes the first further pair of pallets to move forwarn from positions 812 and 813 to positions 814 and 815 (for operations to be performed on them by the work-setter) and the second further pair of pallets to move sideways from positions 810 and 811 to positions 812 and 813. The computer also instructs the transporter 138 to collect the next pair of pallets of the group allocated to that job from the pallet rack and deliver them to the receiving position 807, simultaneously collecting the pair of pallets at the collection position 820. In this manner, while the job is being work-set, the presence of a pair of pallets at the collection position 820 initiates the delivery of a new pair of pallets to the table and moves the pairs of pallets, in sequence, through the actual work-setting positions.

Where the job is loaded into a number of bins, the bins are delivered (via the conveyor 139) to the work-setting table at intervals responsively to the rate at which pallets are loaded by the work-setter. Thus, the arrival at the receiving position 807 of the last pair of pallets for the contents of one bin initiates the delivery of a further bin (whose number is read on arrival and which is received in the compartment 804 after the operator has returned the preceding bin to the conveyor 139).

As a check, when the number of a pair of pallets at the collection position is read, the bin number is also read (in the compartment 804) and signalled back to the computer (with an address signal indicating the particular work-setting table). The loaded pallets collected from the work-setting table are taken by the transporter (which also reads their number) to their allocated compartment in the pallet rack.

When the work-setter has finished loading the last pair of pallets of the group allocated to the job, and has moved them to the collection position 820, the reading of their number causes the computer to stop the count-down on the clock 823 and to initiate the dispatch of the next job to the work-setting table. The work-setter, while waiting for arrival of the bin and pallets for the next job, removes the template from the guide 824 and places it and any other instructions which were used in the bin in the compartment 804 before returning the bin to the conveyor 139.

When (normally at the beginning of an 8 hour day shift) the work-setter is to unload pallets bearing machined workpieces or components a similar procedure is followed but the bins delivered to the work-setting table are empty and the pallets delivered are loaded. The "Unload" section of the display indicator is lit up by the computer and the work-setter removes the workpieces and tooling from the pallets and places them in the empty bins, the empty pallets being collected by the transporter 138 and taken to their allocated compartments in the pallet rack. The filled bins are deposited on the lower run of the conveyor 139 for dispatch to the bin preparation area. In practice, the automatic operations of delivery of the first empty bins and loaded pallets to the work-setting tables can take place before the work-setters arrive to commence their 8 hour shift, so that they are not delayed on commencement.

When the work-setter is required to perform work re-fixing or re-setting operations, the bin containing any necessary tooling, template and instructions for resetting the job is delivered to the work-setting table and the reading of its number on arrival causes the computer to light up the "Re-set" indicator on the panel, and to initiate the delivery of the pallets loaded with the workpieces to be re-set by the transporter 138 from the pallet rack to a work re-setting table associated with the work-setting table (each work re-setting table being associated with a number of work setting tables). The operator, on seeing the lit "Re-set" indicator then takes the bin to the re-setting table.

Figure 3:
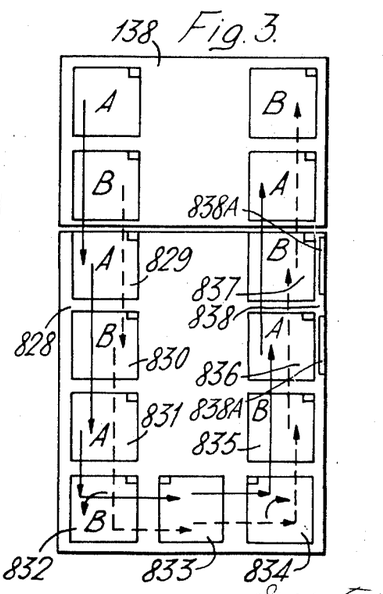
FIG. 3 is a diagrammatic representation of the movement of pallets through a work-resetting station or table.

The passage of pallets through the work re-setting table is slightly different from that through the work-setting table and is diagrammatically shown in FIG. 3. A pair of pallets A and B is delivered from the left-hand platform (as viewed in FIG. 3), of the transporter 138 to a receiving position 828, at which the pallets occupy respectively positions 829 and 830. The pallets A and B are then moved forward to occupy respectively positions 831 and 832. At the position 832 is a turntable adapted firstly to lift the pallet on it to unlink it from the other pallet, and then to rotate the pallet (anticlockwise as viewed in plan) through 90° in order to correctly orientate the pallet for the next position. Pallet B (having been rotated through 90°) is then moved to the right to position 833 at which there is a horizontal platform having associated hydraulically operated devices (as disclosed in U.S. patent specification No. 3,243,178) for automatically shuffling the pallet accurately into position relative to the axes of movement of microscopes (which correspond to the axis of movement of the cutter spindle in a machine tool) in the same way as the pallet is automatically shuffled accurately into position in the machine tool, the pallet being rotated through 90° at position 832 to achieve the same orientation of the pallet at position 833 at that which it assumes in the machine tool. Pallet B, after being shuffled into position, has the necessary work re-setting operations performed on it at position 833, the operations consisting of altering the attitude of the workpiece (e.g. inverting it) relative to the pallet, and/or otherwise re-fixing it (e.g. by application of different clamps), the microscope being used to ensure that the attitude of the re-fixed workpiece bears an accurate predetermined relationship to its attitude before re-fixing. After the re-fixing operations on pallet B, it is moved to the right to position 834, where there is a further turntable adapted to rotate the pallet clockwise through 90° so that it resumes its original orientation. The pallet B is then moved rearward to position 835. Pallet A is then moved forward from position 831 to position 832, rotated anticlockwise through 90°, moved to the right to position 833, and automatically shuffled into position for the work re-setting operations, after which it is moved to position 834, lifted and rotated clockwise through 90°, and then lowered to re-link it with pallet A. The pair of linked pallets A and B is moved rearward to positions 836 and 837 respectively, which together constitute a collection position 838 from which the pallets can be received on the right-hand platform of the transporter 138.

Apart from these differences of path and travel, the passage of pallets through the work-re-setting table is generally similar to that through the work-setting table. Thus, read heads 838A are provided to read the number of a pair of pallets at the collection position 838. The arrival of the first pair of pallets of a job at the receiving position 828 initiates the count down on a clock at the work re-setting table, which count-down is terminated on reading the number of the last pair of pallets carrying workpieces of a particular batch or variety at the collection position (this latter reading also serving to initiate the delivery of a further job to the work-setting table). The work re-setting table, unlike the work-setting table does not have provision to receive bins from or to deliver them to the conveyor 139, the worksetter bringing the bins from, and returning them to the work-setting table.

After completing the work re-setting operations, the operator returns with the bin (into which the resetting template, instructions and any tooling discarded during the re-setting operations are placed) to the work-setting table from which the bin is returned to the conveyor 139.

It will be appreciated that, if desired, instead of the work-setting table operators moving to the work resetting tables to perform work re-setting operations, the work resetting tables could be manned by separate operators and provision made for receipt and delivery of bins to the work re-setting tables in the same way as described in relation to the work-setting table.

Further, work re-setting operations which do not require moving the workpiece relative to the pallet (e.g. which simply require the application of different clamps) and which therefore do not require the use of microscopes to achieve accurate relocation of the workpiece, can be carried out at the work-setting table. In this case the panel includes an indicator giving the instruction "Normal Re-set" when the re-set is to be performed at the work-setting table and an indicator giving the instruction "Microscope Reset" when it is to be performed at the re-resetting table.

Figure 6A:
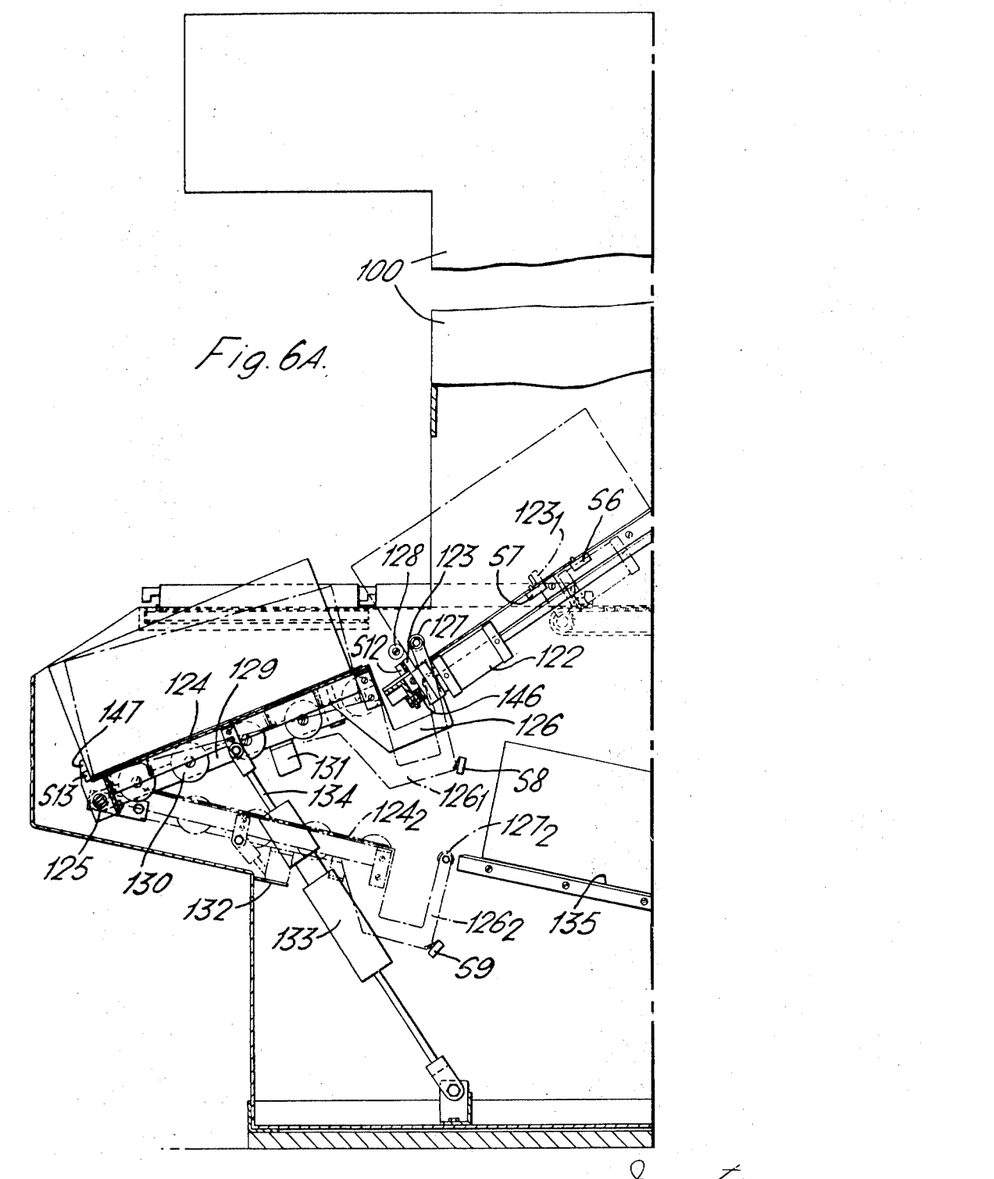
Figure 6B:
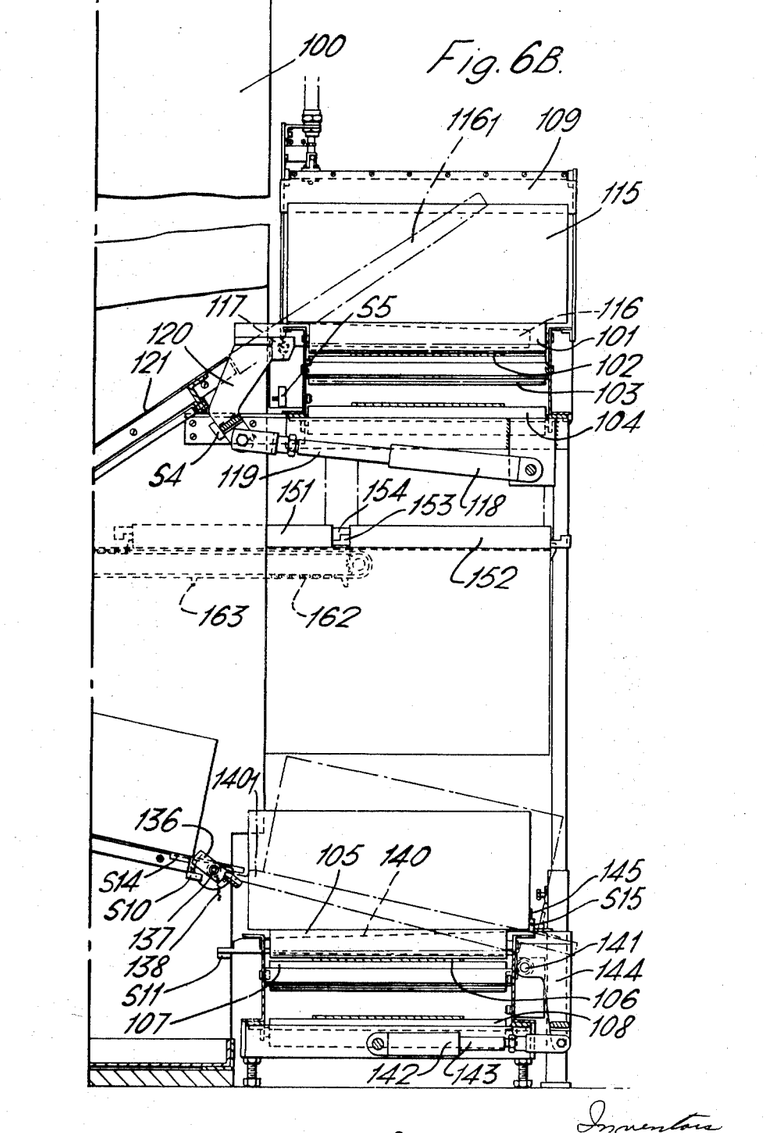
Figure 7:
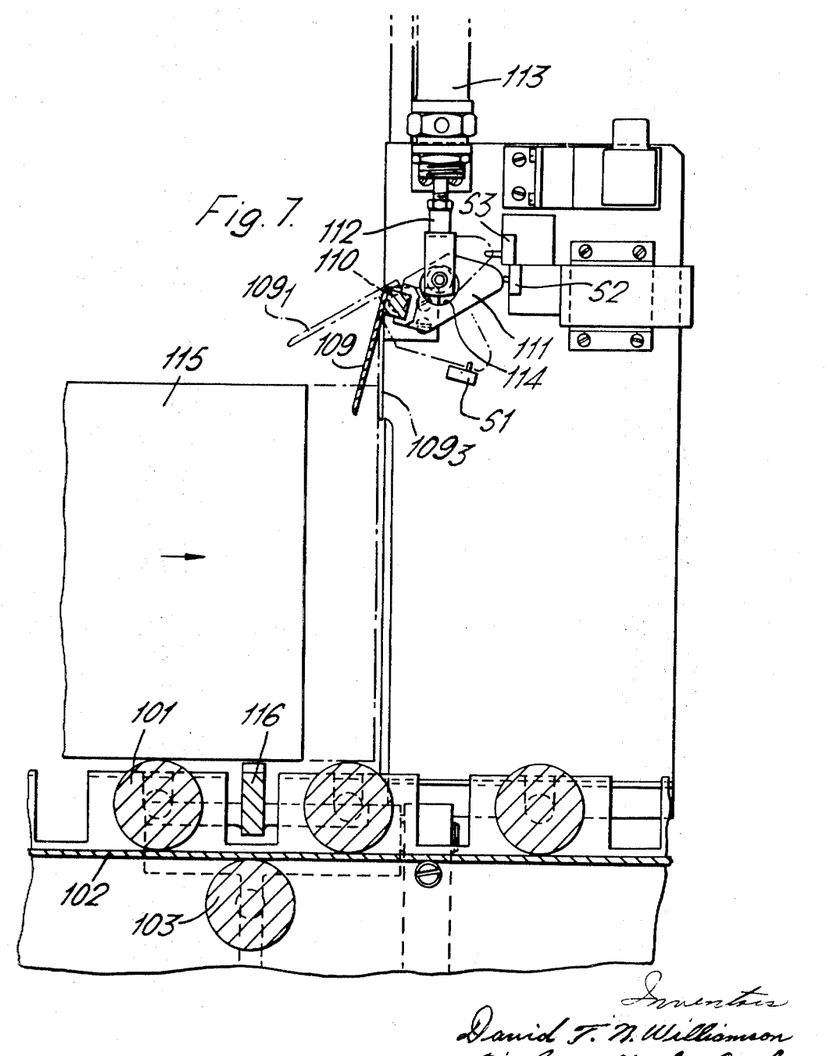
FIG. 7 is an end elevation, partly in section, of part of the mechanism shown in FIG. 6.

Referring now to FIGS. 6 and 7, these show a work-setting station 100, and in particular mechanism for receiving bins at and dispatching them from the station. Associated with the station is an upper horizontal conveyor, which conveys bins to the station, and a lower horizontal conveyor, which conveys bins away from the station. These conveyors serve the same purpose as the conveyor 139 (FIG. 1) previously described, but consist of roller conveyors. Thus the upper conveyor comprises a series of rollers 101 driven by an endless band 102 whose upper run passes between the rollers 101 and backing rollers 103. The lower run of the band 102 travels over support rollers 104, and the band is driven in any convenient manner. In a similar fashion, the lower conveyor comprises a series of rollers 105 driven by an endless band 106 whose upper run passes between the rollers 105 and backing rollers 107. The lower run of the band 106 travels over support rollers 108, and the band is driven in any convenient manner. The direction of drive of the bands 102 and 106 is such that the rollers 101 and 105 respectively rotate in, and can therefore feed bins in, opposite directions.

The bins used with the work-setting station 100 differ from that shown in FIG. 5 to the extent that they do not have the partly open inclined front face there shown, but consist of simple open-topped rectangular box-like containers.

Mounted above the upper conveyor comprising the rollers 101 is a bin-stopping device comprising a flap member 109 movable about a pivot 110. The flap member is connected to an arm 111 which can be moved by the actuator rod 112 of a pneumatic jack 113, the rod 112 carrying a projection located in a hole 114 in the arm 111. The flap member 109 is movable about its pivot 110 three positions. In its first position, shown in broken line in FIG. 7 and indicated as 1091, the flap member is above and clear of bins fed by the rollers 101. In its second position, shown in full line in FIG. 7 and indicated simply as 109, the flap member is in the path of bin, shown as 115, being fed by the rollers 101. The flap member can be moved between its first and second positions by operation of the jack 113. When a bin abuts the flap member 109 it moves the flap member about its pivot to a third position, shown in broken lines in FIG. 7 and indicated as 1093, the hole 114 in the arm 111 being large enough in relation to the projection on the rod 112 to permit such movement, and the flap member then arrests the bin. Switches S1, S2 and S3, are respectively operated by the arm 111 at its three positions for a purpose explained later.

A pair of arms 116, only one of which is shown in FIGS. 6 and 7, are movable about a pivot 117 on a fixed bracket. The arms 116 lie between rollers 101 at positions under a bin arrested by the flap member 109, and can be moved about their pivots 117 to the position shown in broken line and indicated as 1161 in FIG. 6 to lift a bin from the rollers 101 and incline the bin. Such movement of each arm 116 is effected by a pneumatic jack 118 whose actuator rod 119 is pivoted to an elbow element 120 connected to the arm. Switches S4 and S5, whose purpose is more fully explained later, are operated by the element 120 to indicate whether the arm 116 is raised or lowered.

Raising of the arms 116 aligns a bin carried thereon with an inclined support ramp 121 on to and down which the bin can slide from the arms 116. Associated with the ramp 121 is a pneumatic jack 122 which carries a stop 123. The jack is operable to move the stop 123 from the position shown in broken line and indicated as 1231 in FIG. 6 down the ramp 121 to the position shown in full line. In traveling down the ramp 121 the bin operates two switches S6 and S7 whose purpose is described later.

Adjacent the bottom end of the ramp 121 is a bin-carrying table 124 which is movable about a fixed pivot 125, and effectively forms the base of a compartment. Carried by the table is a forked bracket having two forward arms 126 (only one of which can be seen in FIG. 6) each carrying a roller 127 at its extremity. When the table 124 and the forked bracket are moved about the pivot 125, from a middle position, in which the arms 126 are shown in broken line and indicated as 1261 in FIG. 6, to the upper position shown in full line in FIG. 6, the rollers 127 engage the forward end of the base of a bin arrested by the stop 123 at the lower end of the ramp 121, and raise it to the level of a fixed roller 128. The bin can then run over the rollers 127 and 128 and be received on the table 124. The table can then be lowered to its middle position, which is the position it occupies while a work-setting operator is working from the bin.

When the bin is to be dispatched from the work-setting station, the table 124 can be moved about its pivot 125 to a lower position shown in broken line in FIG. 6A and indicated as 1242, the arms 126 and rollers 127 then respectively occupying positions indicated as 1262 and 1272. A bracket 129 carrying wheels 130 is mounted for movement about the pivot 125 with the table 124. When the table is at its middle and upper positions the peripheries of the wheels 130 lie below the table surface, but when the table is moved to its lower position 1242 a projection 131 on the bracket 129 engages a fixed abutment 132 causing upward movement of the bracket 129 relative to the table. The upper plate which provides the bin-supporting surface of the table 124 is provided with slots through which the wheels 130 then project. The bin can then run over the wheels 130 and the rollers 127 (then at position 1272) and be delivered from the table.

Movement of the table 124 about its pivot 125 is effected by a pneumatic jack 133 whose actuator rod 134 is pivoted to the table. The jack 133 has two strokes, one of which effects movement of the table between its upper and middle positions, and the other of which effects movement of the table between its middle and lower positions. Switches S8 and S9, operated by the arms 126, respectively indicate for a purpose explained later when the table is at its middle and lower positions.

A bin delivered from the table 124 is received on an inclined support ramp 135 down which it slides. At the bottom end of the ramp 135 is a stop arm 136 movable about a pivot 137 and normally retained by a spring 138 at a position such that it projects from the ramp surface to arrest a bin.

Between rollers 105 of the lower conveyor are arms 140 (similar to the arms 116 described above) movable about fixed pivots 141. A pneumatic jack 142, whose actuator rod 143 is pivotally connected to an element 144 carried by the arms 140, can move the arms between a horizontal position and a raised position shown in broken line and indicated as 1401. At the raised position the arms are aligned with the ramp 135, and in moving upwardly the ends of the arms engage the stop arm 136 to move the latter about its pivot and release the bin. The bin then slides onto the arms 140 and is arrested by a stop 145 thereon. The arms can then be lowered, by operation of the jack 142, so that the bin is received on the rollers 105 and fed thereby along the lower conveyor. A switch S10, operated by the stop arm 136, indicates when the arms 140 are raised, and a switch S11, operated by the arms 140, indicates when the latter are lowered.

Operation of the mechanism described above with reference to FIGS. 6 and 7 is as follows:

When a bin destined for the worksetting station is placed on the upper conveyor comprising the rollers 101, the controlling on-line computer operates the jack 113 to move the flap 109 to its central position. On such movement the flap operates the switch S2 to indicate to the computer that it is properly positioned. When the bin hits the flap 109 it moves the latter to its third position, at which switch S3 is operated indicating arrival of the bin. Responsively to operation of switch S3 the jack 118 is operated to raise the arms 116 and lift the bin so that it slides onto and down the ramp 121. Operation of switch S5 by the element 120 indicates to the computer that the arms 116 have been raised.

As the bin slides down the ramp 121 its leading end first operates the switch S6. Before such operation the stop 123 is in the position indicated as 1231. Responsively to operation of the switch S6 the jack 122 is actuated to move the stop 123 down the ramp 121 at a speed less than that of the bin. By this arrangement, unduly hard abutment of the bin against the stop is avoided.

Operation of switch S7 by the leading end of the bin indicates the latter is clear of the arms 116, which can therefore be lowered by actuation of the jack 118, operation of the switch S4 indicating that such lowering has been effected. The flap 109 can also be moved, by actuation of the jack 113, to its first position 1091, operation of switch S1 indicating achievement of such movement. Further bins can then pass, on the upper conveyor, beneath the flap to other work-setting stations, there being a line of such stations as described in U.S. application Ser. No. 695,817.

When the stop 123, with the bin thereagainst, reaches the bottom of the ramp 121, it abuts a stop 146 and simultaneously operates a switch S12 indicating arrival of the bin at that position. Responsively to such indication a light is put up on a display panel at the station to inform the work-setting operator that a bin is present.

As previously described, the bins have identifying binary numbers marked thereon, e.g. on the base thereof, and there may be provided a read head at the bottom of the ramp 121 to read such number and transmit a signal indicative thereof to the computer.

When the operator is ready, he (or she) presses a button, which effects actuation of the jack 133 to raise the table 124 to its upper position, thereby lifting the forward end of the bin and effecting transfer thereof to the table as previously described. The bin slides onto the table and abuts a stop 147, simultaneously operating a switch S13 which indicates to the computer arrival of the bin on the table. A further read head associated with the table 124 transmits a signal indicative of the bin's identifying number to the computer.

Responsively to indication of arrival of the bin, jack 122 is actuated to return the stop 123 to its upper position 1231. The computer then operates the jack 133 to lower the table 124 to its middle position, and simultaneously lights up a legend (as previously described) on the operator's display panel indicating the type of work-setting operation(s) to be performed in connection with the bin. For example, the operator may be required to load workpieces and tooling in the bin onto pallets, or to unload workpieces and tooling from pallets and place them in the bin. Operation of the switch S8 by the arms 126 indicates to the computer that the table has been lowered to its middle "working" position.

On completion of the work-setting operation(s) for which the bin is required, the operator presses a button to actuate the jack 133 and lower the table 124 to its lower position, operation of the switch S9 by the arms 126 indicating to the computer that such lowering has been effected, so that the displayed legend can be erased. The bin then runs over the wheels 130 and rollers 127 (then at position 1272) onto the ramp 135, to be arrested thereon by the stop arm 136. A switch S14 at the bottom end of the ramp 135 is operated by the bin, and indicates to the computer that a bin has arrived there and is ready for transfer to the lower conveyor.

Responsively to such indication the computer actuates the jack 142 to raise the arms 140, whereby the stop arm 136 releases the bin which slides onto the arms 140 as described above. Operation of the switch S10 indicates that the arms 140 have been raised, and when the bin abuts the stop 145 it operates a switch S15 which indicates to the computer that the bin has been received on the arms. The computer can then actuate the jack 142 to lower the arms 140, operation of the switch S11 indicating that such lowering has been effected. Lowering of the arms 140 releases the stop arm 136 to return to its projecting position under the action of the spring 138. The bin is then carried away on the lower conveyor comprising the rollers 105.

As explained in the last mentioned application, bins are dispatched from and returned to a bin-preparation area from and to which the upper and lower conveyors run. It will be appreciated that the jacks described as pneumatic jacks could be hydraulic jacks, if preferred, and that the particular arrangement of switches described can readily be modified to suit requirements.

Pallets are delivered to the work-setting station 100 by a transporter in essentially the same manner as described above in relation to the station shown in FIG. 1 and as described in the last mentioned application. The transporter there described is, however, modified to the extent that it comprises a platform 150 (FIG. 8) capable of carrying two pairs of linked pallets side-by-side. It will be seen from comparison of FIGS. 2 and 8 that the spacing between the two pairs of pallets carried on the platform 138 in the former is greater than that between the two pairs of pallets on the platform 150 in the latter. The spacing of the pair of pallets in FIG. 8, in fact, corresponds to the pitch between columns of compartments in the rack between which and the station 100 the transporter transfers pallets as described in the last mentioned patent application.

Figure 8:
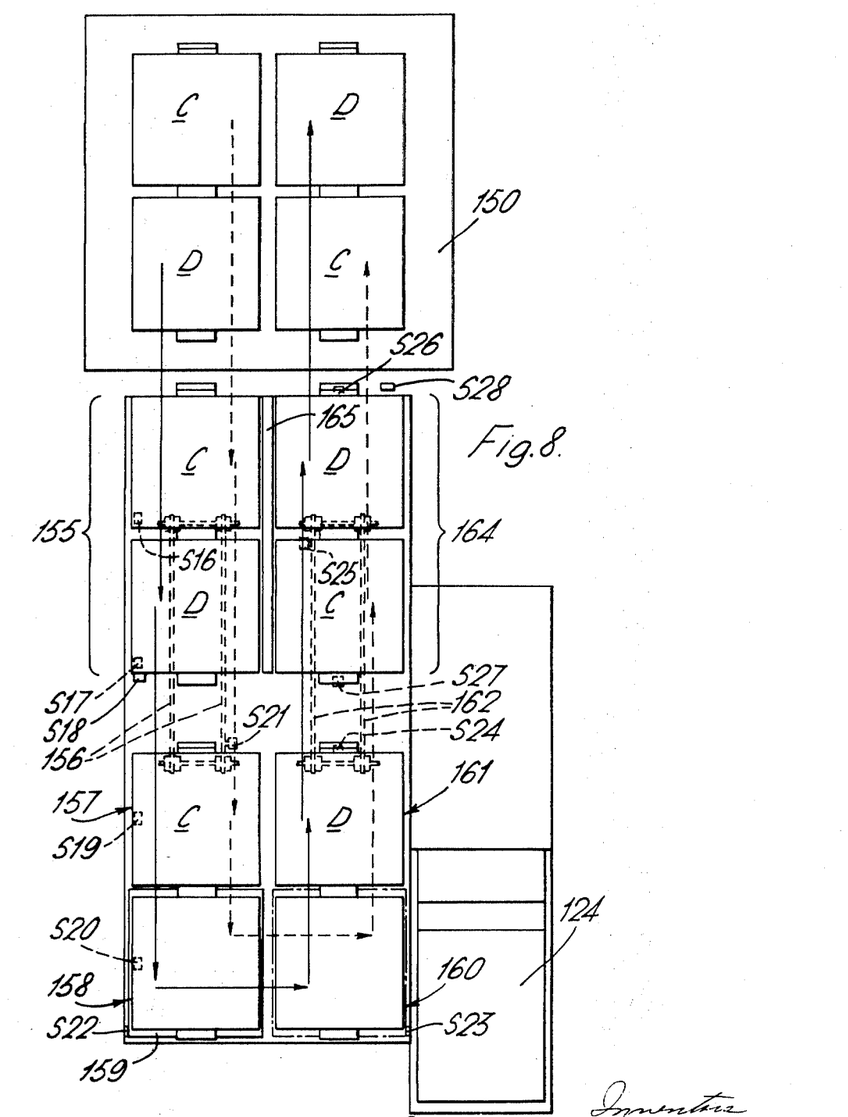
FIG. 8 is a diagrammatic plan view showing the travel of pallets between a transporter and the work-setting station shown in FIG. 6.

The pallets used with the station shown in FIGS. 6 to 8 differ from those shown in FIG. 4 to the extent that each pallet has a handle-like projection at each end, the handle at one end having an upwardly projecting portion and that at the other end having a corresponding downwardly depending portion. A pair of pallets can then be linked by inter-engagement of the downwardly depending handle portion on one with the upwardly projecting handle portion on the other. FIG. 6B shows a pair of pallets, indicated as 151 and 152, so linked, the handles being indicated as 153 and 154. By this arrangement the pallets of a pair can be linked and unlinked by simple sliding of the pallets relatively to each other in either direction without the need for lifting one of them.

The work-setting station 100 has a pallet support table over which the pallets are moved in a manner indicated in FIG. 8, which shows the travel of a pair of pallets C and D from the transporter platform 150 over the support table, and back to the transporter platform. Movement of pallet C is indicated by broken line arrows and movement of pallet D by full line arrows.

After the transporter, under control of the on-line computer, has aligned its platform 150 with the work-setting station 100 as shown, the mechanism associated with the platform is operated to deliver the linked pair of pallets C and D to a receiving position, indicated as 155, on the station's support table. On such delivery the pallets operate switches S16 and S17, which indicate arrival of the pallets to the computer. The front face of the leading pallet D also operates a switch S18 responsively to which a light is set on the station's display panel to indicate the arrival of a pair of pallets to the work-setting operator.

The operator, when ready, then presses a button which starts the drive of a pair of endless chain conveyors 156 having projecting pushers which engage the pallets. Pushers initially engage behind the rear face of the leading pallet D and move it, and the pallet C to which it is linked, forwardly. Further pushers then engage behind the rear face of the trailing pallet C when the latter reaches the range of action of the chains 156. In this manner the pallets are fed forwardly to positions indicated as 157 and 158, switches S19 and S20 being operated by the pallets to indicate their arrival at these positions. As the pallets approach these positions a pusher on one of the chains 156 operates a switch S21 which stops the chain drive.

At the position 158 is a movable table 159 which can readily be slid (e.g. on air bearings) to an adjacent position indicated as 160. Micro-switches S22 and S23, operated by the table 159, indicate which of the positions 158 and 160 it occupies at any particular time. The leading pallet D is intially received on the table 159 at the position 158, and the table is then moved by the operator to the position 160 (thereby unlinking the pallets). The operator then presses a button responsively to which the table 159, and the pallet thereon, are clamped at position 160, and then performs the required work-setting operation involving that pallet. On completion of that operation the operator presses a button to reelase the clamped pallet and table, and pushes the pallet forwardly to a position indicated as 161. On reaching this position the pallet abuts a retractable stop incorporating a switch S24, which indicates to the computer that the first pallet of a pair has arrived there.

The operator then returns the table 159 to the position 158 and pulls the second pallet C on the table. If desired, to avoid manual pulling of the pallet on to the table, devices could be provided (e.g. the chains 156 could be extended) to effect a mechanical transfer. On receipt of the pallet C on the table 159, the operator moves the table to position 160 (thereby re-linking pallet C with pallet D), and pushes the button to effect clamping of the table and pallet. The required work-setting operation is then performed on pallet C, after which the clamping is released.

The operator then presses a button which retracts the stop incorporating switch S24, and starts the drive of a pair of chain conveyors 162 carrying projecting pushers 163 (FIG. 6B). Initially the pushers engage behind the leading end of pallet D (the pallet base being recessed) and push it forwardly, pallet C following because it is linked to pallet D. When the rear end of pallet C reaches the range of action of the chains 162 further pushers engage behind its rear face and move the linked pair of pallets to a collection position indicated as 164. As the palets approach the collection position, a switch S25 is operated by a pusher on one of the chains 162 and is effective to stop the chain drive. On reaching the collection position the leading pallet D abuts a retractable stop incorporating a switch S26 which indicates to the computer arrival of the pallets at the collection position. A switch S27, if it falls to be cleared by the rear end of the trailing pallet C, indicates "under-travel" of pallets, and a further switch S28, if engaged by the front end of the leading pallet D, indicates "over-travel."

Adjacent the collection position 164 is a read-head device 165 capable of reading the identifying binary numbers (provided on the pallets as previously described) of the pallets, and transmitting a signal indicative thereof to the computer. On receipt of such signal the computer controls the transporter (when other commitments allow) to re-align its platform 150 with the work-setting station. The mechanism associated with the platform is then operated to draw the linked pair of pallets C and D on to the platform as shown.

As previously explained, the delivery of bins and pallets to the work-setting station is co-ordinated by the controlling on-line computer. The various switches indicate to the computer what positions on the pallet support table are occupied by pallets at any time, and in particular indicate when the receiving position 155 is vacant and ready for delivery of a further pair of pallets, and when the collection position 164 is occupied by pallets ready to be collected. In so far as is possible, the transport operation are arranged so that the transporter delivers one pair of pallets to the receiving position 155 simultaneously with the collection of a pair of pallets from the position 164.

Figure 9:
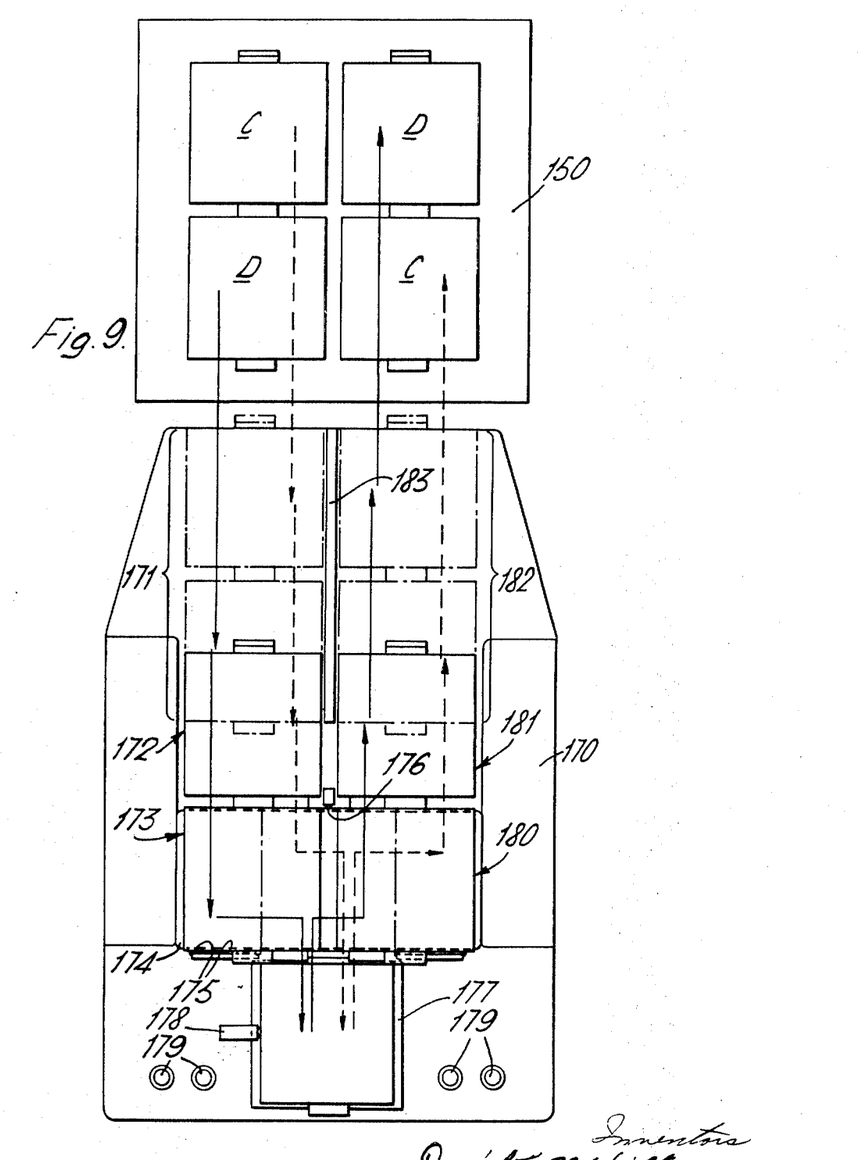
FIG. 9 is a diagrammatic plan view showing the travel of pallets between a transporter and a work re-setting station.

FIG. 9 shows the travel of pallets over a pallet support table in a work-resetting station 170, which is modified from that shown in FIG. 3 to co-operate in the feed of pallets with the transporter having a platform 150 (as in FIG. 8) which carries more closely spaced pallet pairs.

A pair of linked pallets C and D (of the same form as those described with reference to FIGS. 6 and 8) is delivered from the transporter platform 150, by its associated mechanism, to a receiving position indicated as 171 on the support table at the station 170. As previously, movement of pallet C is indicated in broken line and movement of pallet D in full line. The pallets C and D are then moved forwardly by chain conveyors (not shown in FIG. 9) similar to the chain conveyors 156 in FIG. 8, to positions indicated as 172 and 173 respectively. The chain conveyors are driven responsively to the pressing of a button by the operator as described in relation to FIG. 8..

At the position 173 is a movable trolley 174 on which the leading pallet D is received. The operator then moves the trolley, carrying the pallet on it, approximately half a pitch to the right as viewed in FIG. 9 (thereby unlinking pallet D from pallet C), such movement being guided by rollers 175 and 176. The pallet is then aligned with an entrance to a work resetting tabe 177 on to which the pallet is moved manually by the operator.

The table 177 has electro-mechanical devices as described in U.S. patent specification No. 3,243,178 which operates automatically to shuffle the pallet into accurate position relative to X and Y coordinate axes on which microscopes used for work resetting operate. A pallet biasing device 178 operates (e.g. by pneumatic pressure) to push or bias the pallet to the right as viewed in FIG. 9). The reason for the biasing device 178 is that the pallet-shuffling devices as described in the last mentioned specification, operate in the machine tools to which the pallets are fed to act on a vertical pallet supported on a vertical machining table. Thus, in the machine tools the pallets are biased by gravity which acts parallel to the pallet's workpiece carrying face. The work resetting table 177 is horizontal, as is a pallet supported thereon. It is therefore necessary to apply an artificial bias, in a direction parallel to the pallets work supporting face, to provide load conditions on the pallet comparable with those it is subjected to in the machine tools, to achieve proper operation of the shuffling devices.

After the pallet has been shuffled into accurate location and clamped (which is indicated by a light on a display panel at the resetting station) the operator performs the required work resetting operation (e.g. inverting and acurately relocating a partly machined workpiece) on the pallet, using control knobs 179 for the microscopes. On completion of the operation the operator presses a button to unclamp the pallet, and manually pushes the pallet from the table 177 back on to the trolley 174 (which is aligned with the entrance to the table). The trolley is then moved to the right (as viewed in FIG. 9) to a position indicated as 180.

Pallet D is then moved forwardly from the trolley to a position indicated as 181. Such movement may be effected manually by the operator, but is preferably achieved by the use of power driven chain conveyors like the conveyor 162 (FIG. 8). The operator then moves the trolley 174 to the left, to occupy position 173, and the second pallet C is drawn from position 172 on to the trolley. This may similarly be done manually by the operator, but is preferably effected by the use of power driven chain conveyors like the conveyors 156 (FIG. 8).

After receipt of pallet C on the trolley 174, the latter is moved manually approximately half a pitch to the right, the pallet is drawn on to the table 177, shuffled into accurate position and clamped, and then subjected to the required work resetting operation. After completion of the operation the pallet is unclamped and moved manually from the table 177 back on to the trolley 174. The trolley is moved manually to the right to position 180, whereby pallet C is relinked with pallet D.

Responsively to the pressing of a button by the operator, the linked pallets C and D are moved forwardly to a collection position indicated as 182, such movement being effected by chain conveyors like the conveyors 162 (FIG. 8) not shown in FIG. 9. A read-head 183 adjacent the collection position reads the identifying binary numbers on the pallets and transmits a signal indicative thereof to the on-line computer. The computer then controls the transporter, when other commitments allow, to re-align its platform 150 with the work resetting station and effect collection of the linked pair of pallets by means of the mechanism associated with the platform.

The pellet support table of the work resetting station 170 has retractable stops and switches, not shown in FIG. 9, in essentially the same manner as the work-setting station 100 shown in FIG. 8. Thus, notably, switches indicate to the computer when a pair of pallets has been delivered to the receiving position 171, when a pair of pallets has arrived at the position 182 and is ready for collection, and when the receiving position 171 is vacant and ready for receipt of a further pair of pallets. As in the case of the work-setting station 100, the transfer of pallets by the transporter to and from the work resetting station 170 is arranged, in so far as is possible, so that a pair of pallets is delivered to the receiving position 171 simultaneously with the retrieval of a pair of pallets from the collection position 182.

What we claim as our invention and desire to secure by Letters Patent is:

1. A work-setting station comprising support means to support a plurality of workpiece holders and having a receiving position at which a workpiece holder can be received on the support means, a collection position from which a workpiece holder can be collected from the support means, and a work-setting position at which a work-setting operation can be performed on a workpiece holder, and guide means to guide a workpiece holder from said receiving position to said work-setting position and from said work-setting position to said collection position.

2. A work-setting station as claimed in claim 1 further comprising feed means operable to feed a workpiece holder from said receiving position to said work-setting position, and from said work-setting position to said collection position.

3. A work-setting station as claimed in claim 2 wherein said feed means are driven chains.

4. A work-setting station as claimed in claim 2 wherein said receiving and collection positions are disposed adjacent one side of the station and said work-setting position is disposed adjacent the opposite side of the station.

5. A work-setting station as claimed in claim 1 further comprising container support means defining a compartment for a container containing material to be used in a work-setting operation.

6. A work-setting station as claimed in claim 5 wherein said container support means includes a container-receiving position at which a container can be received thereon, and a container delivery position at which a container can be delivered therefrom, and further comprising additional guide means to guide a container from said container receiving position to said compartment and from said compartment to said container delivery position.

7. A work-setting station as claimed in claim 6 wherein said container receiving position is located at a higher level than said compartment, and further comprising an inclined ramp extending from said container receiving position to said compartment.

8. A work-setting station as claimed in claim 7 further comprising an associated conveyor to feed a container towards said container receiving position, and a movable member adapted to raise a container with said conveyor and to incline the container to align it with said ramp.

9. A work-setting station as claimed in claim 8 further comprising an additional associated conveyor to feed a container away from said container delivery position, and an additional movable member adapted to be inclined to align with said ramp and receive a container therefrom, and to lower a container so received on to said conveyor.

10. A work-setting station as claimed in claim 6 wherein said compartment includes a movable base for releasing a container from the compartment.

11. A work-setting station as claimed in claim 10 wherein said container receiving and delivery positions are disposed adjacent said one side of the station and said compartment is disposed adjacent said opposite side of the station.

12. A work-setting station as claimed in claim 7 wherein the receiving and collection positions for workpiece holders are disposed at a level below that of the container receiving position and above that of the container delivery position.

13. A work-setting station as claimed in claim 5 further comprising sensing means to sense the presence of a container in said compartment.

14. A work-setting station as claimed in claim 13 wherein said sensing means read an identifictaion on a container in said compartment.

15. A work-setting station as claimed in claim 13 further comprising devices at said work-setting position for automtaically locating a workpiece holder accurately for a work-setting operation.

16. A work-setting station as claimed in claim 15 further comprising a turntable located in the path of travel of a workpiece holder between said receiving position and said work-setting position to change the orientation of a workpiece holder.

17. A work-setting station as claimed in claim 15 further comprising a turntable located in the path of travel of a workpiece holder between said work-setting position and said collection position to change the orientation of a workpiece holder.

18. A work-setting station as claimed in claim 16 further comprising additional sensing means to sense the presence of a workpiece holder at a predetermined position in the station.

19. A work-setting station as claimed in claim 18 wherein said additional sensing means read an identification on a workpiece holder at said predetermined position.

20. A work-setting station as claimed in claim 19 wherein said sensing means include means disposed to sense the presence of a workpiece holder at said collection position.

21. A work-setting station as claimed in claim 20 including associated control means to operate said feed means to feed a workpiece holder to said work-setting position responsively to the detection of said sensing means of a workpiece holder at said collection position.

22. A work-setting station as claimed in claim 15 further comprising display means effective to display an indication of the type of work-setting operation required to be performed on a workpiece holder at said work-setting position.

23. A work-setting station as claimed in claim 22 further comprising receiving means to receive and support prepared definition means for application to a workpiece holder at said work-setting position to provide a definition of the required arrangement of parts relative to the holder for the securing of a workpiece thereto.

24. A work-setting station as claimed in claim 23 wherein said receiving means are adapted to receive and support a template which constitutes said prepared definition means.

References Cited

UNITED STATES PATENTS

| | | | |
|---|---|---|---|
| 3,077,660 | 2/1963 | Essenberg | 29—208 |
| 3,323,630 | 6/1967 | Fowler et al. | 198—19 |
| 3,391,473 | 7/1968 | Hays | 29—208 X |

THOMAS H. EAGER, Primary Examiner

U.S. Cl. X.R.

198—19